(12) United States Patent
Hein et al.

(10) Patent No.: US 6,814,027 B2
(45) Date of Patent: Nov. 9, 2004

(54) MILKER UNIT DETACHER FOR ROTARY MILKING PARLOR

(75) Inventors: Patrick M. Hein, Viroqua, WI (US); Jeffrey S. Hanson, Melrose, WI (US); Michael Heinrich, Lippstadt (DE); Frank Hoelscher, Rheda-Wiedenbruck (DE); Larry G. Larson, Holmen, WI (US); Peter Kaever, Oelde (DE); Karsten Schonrock, Hagen (DE)

(73) Assignee: WestfaliaSurge, Inc., Naperville, IL (US)

( * ) Notice: Subject to any disclaimer, the term of this patent is extended or adjusted under 35 U.S.C. 154(b) by 0 days.

(21) Appl. No.: 10/242,271

(22) Filed: Sep. 12, 2002

(65) Prior Publication Data

US 2004/0050331 A1 Mar. 18, 2004

(51) Int. Cl.[7] .................................................. A01J 3/00
(52) U.S. Cl. ................ 119/14.04; 119/14.1; 119/14.03; 119/14.08; 119/520
(58) Field of Search .................... 119/14.04, 14.1, 119/14.13, 14.03, 14.08, 520

(56) References Cited

U.S. PATENT DOCUMENTS

| | | | | |
|---|---|---|---|---|
| 3,709,196 A | * | 1/1973 | Hicks ..................... | 119/14.04 |
| 3,738,321 A | * | 6/1973 | Hicks ..................... | 119/14.45 |
| 3,938,470 A | | 2/1976 | Pace | |
| 4,034,713 A | * | 7/1977 | Umbaugh ............... | 119/14.02 |
| 4,056,077 A | * | 11/1977 | Schluckbier ............ | 119/14.08 |
| 4,188,910 A | * | 2/1980 | Hocker ................... | 119/14.08 |
| 4,228,763 A | | 10/1980 | Heidecker et al. | |
| 4,263,874 A | * | 4/1981 | Flocchini ................ | 119/14.08 |
| 4,333,421 A | * | 6/1982 | Schluckbier ............ | 119/14.08 |
| 4,523,545 A | * | 6/1985 | Kummer ................. | 119/14.08 |
| 4,586,462 A | | 5/1986 | Icking | |
| 4,685,422 A | | 8/1987 | Middel et al. | |
| 5,020,477 A | | 6/1991 | Dessing et al. | |
| 5,379,721 A | | 1/1995 | Dessing et al. | |

(List continued on next page.)

FOREIGN PATENT DOCUMENTS

| | | | |
|---|---|---|---|
| DE | 87 07 855.4 | 2/1987 | |
| DE | 43 39 131 A1 | 5/1995 | |
| EP | 1 169 914 A2 | 9/2002 | |
| EP | 1169914 A2 | 9/2002 | |
| JP | 06178628 A | * 6/1994 | ............. A01J/7/00 |

OTHER PUBLICATIONS

PCT/ISA/220, International Search Report, received Mar. 26, 2004, 4 pgs.
Westfalia–Surge, Inc., Omni Elite Detachers, Mar. 2000, 8 pgs.
Westfalia–Surge, Inc., Omni Detacher Packages, Mar. 2000, 8 pgs.
Hunt, Peter, "It really is the dairy of the future here today," Milking new technology, Weekly Times, Edition 1—FIRSTWED Aug. 9, 2000, (photocopy), 2pgs.
Hunt, Peter, "It really is the dairy of the future here today," Milking new technology, Weekly Times, Edition 1—FIRSTWED Aug. 9, 2000, (print copy), 2pgs.

*Primary Examiner*—Robert P. Swiatek
*Assistant Examiner*—Joan M. Olszewski
(74) *Attorney, Agent, or Firm*—Smith & Amundsen

(57) ABSTRACT

A rotary milking parlor milker detacher having a pivoting support arm and retracting chain arrangement that is synchronized with a rotating platform position to move the detacher between a storage position, a presentation position, and a milking position to protect the detacher from damage and provide a superior ergonomic design that reduces operator fatigue and turnover.

25 Claims, 16 Drawing Sheets

U.S. PATENT DOCUMENTS

| | | | |
|---|---|---|---|
| 5,379,722 A | * | 1/1995 | Larson ................... 119/14.1 |
| 5,431,128 A | * | 7/1995 | Nilsson et al. ........... 119/14.08 |
| 5,606,932 A | | 3/1997 | van der Lely |
| 5,634,428 A | * | 6/1997 | Koster ................... 119/14.1 |
| 5,697,324 A | | 12/1997 | van der Lely |
| 5,722,343 A | | 3/1998 | Aurik et al. |
| 5,743,209 A | | 4/1998 | Bazin et al. |
| 5,784,994 A | | 7/1998 | van der Lely |
| 5,809,931 A | | 9/1998 | Ellis et al. |
| 5,826,536 A | | 10/1998 | van der Lely et al. |
| 5,842,436 A | | 12/1998 | van der Lely |
| 5,873,323 A | | 2/1999 | van den Berg et al. |
| 5,937,786 A | | 8/1999 | Peacock |
| 5,960,737 A | | 10/1999 | Larson et al. |
| 6,044,793 A | | 4/2000 | van der Lely |
| 6,050,219 A | | 4/2000 | van der Lely |
| 6,148,766 A | | 11/2000 | van der Lely |
| 6,213,051 B1 | | 4/2001 | Fransen |
| 6,279,507 B1 | | 8/2001 | van der Lely et al. |
| 6,382,130 B1 | * | 5/2002 | Rooney ................... 119/14.04 |
| 6,450,118 B1 | | 9/2002 | Eppers, Jr. |
| 2002/0002952 A1 | | 1/2002 | van der Lely et al. |
| 2002/0005172 A1 | | 1/2002 | van der Lely et al. |
| 2003/0019433 A1 | * | 1/2003 | Johannesson et al. .... 119/14.03 |

* cited by examiner

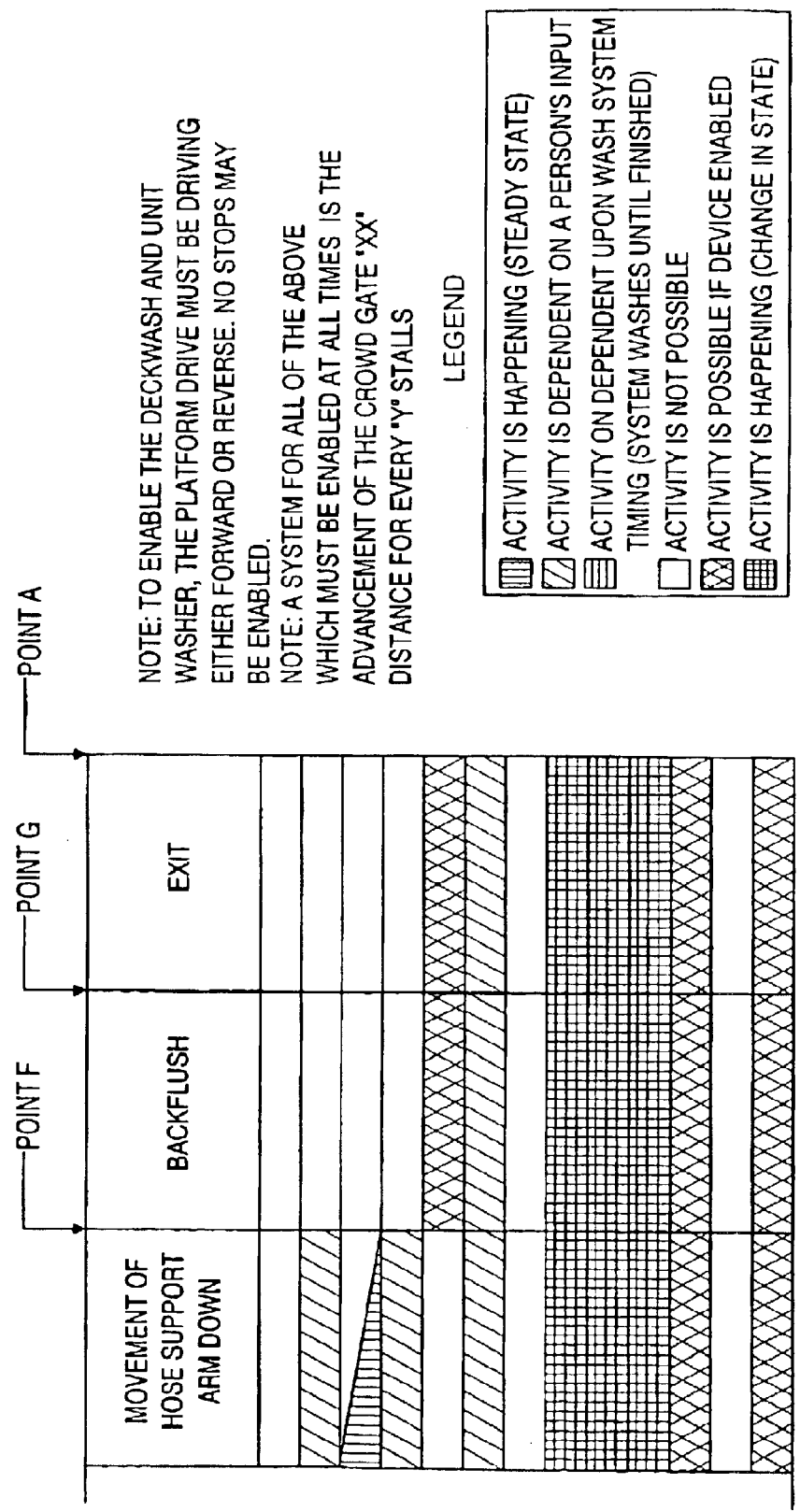

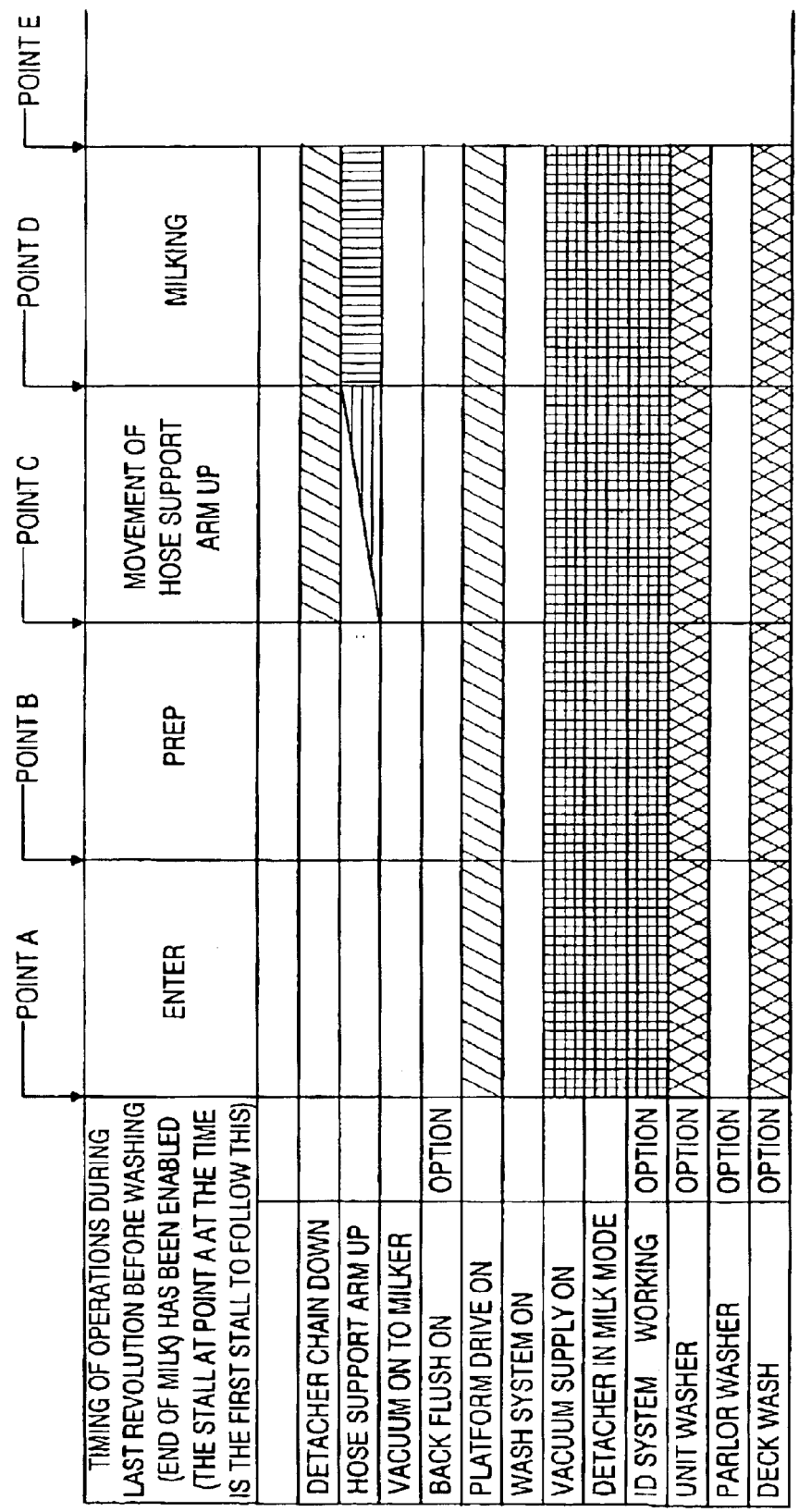

Fig. 17b

NOTE: TO ENABLE THE DECK WASH AND UNIT WASHER, THE PLATFORM DRIVE MUST BE DRIVING EITHER FORWARD OR REVERSE. NO STOPS MAY BE ENABLED.

NOTE: NORMAL MILKING MEANS ANY STALL WHICH HAS PASSED POINT F AFTER THE ENABLING OF HOSE SUPPORT ARMS UNTIL THE END OF MILK-LAST STALL HAS PASSED POINT C. ONCE THE END OF MILK HAS BEEN INITIATED, ALL STALLS AFTER THE ONE AT POINT A IN REVOLUTION GO TO THE TABLE FOR WASH MODE ABOVE.

NOTE: A SYSTEM FOR ALL OF THE ABOVE WHICH MUST BE ENABLED AT ALL TIMES IS THE ADVANCEMENT OF THE CROWD GATE "XX" DISTANCE FOR EVERY "Y" STALLS

| Fig. 17a | Fig. 17b |

NOTE: ONCE HOSE SUPPORT ARMS HAVE REACHED THE UP POSITION, ACTIVITY IS DISABLED UNTIL IT IS RESET. (SEE FIRST REVOLUTION TABLE)

PERSON MUST PLACE UNIT IN C IF MOUNT

LEGEND
- ACTIVITY IS HAPPENING (STEADY STATE)
- ACTIVITY IS DEPENDENT ON A PERSON'S INPUT
- ACTIVITY ON DEPENDENT UPON WASH SYSTEM TIMING (SYSTEM WASHES UNTIL FINISHED)
- ACTIVITY IS NOT POSSIBLE
- ACTIVITY IS POSSIBLE IF DEVICE ENABLED
- ACTIVITY IS HAPPENING (CHANGE IN STATE)

| MOVEMENT OF HOSE SUPPORT ARM DOWN | BACKFLUSH | EXIT |
|---|---|---|
| POINT F | POINT G | POINT A |

TIMING DIAGRAMS FOR AUTOMATION OF AUTOROTOR

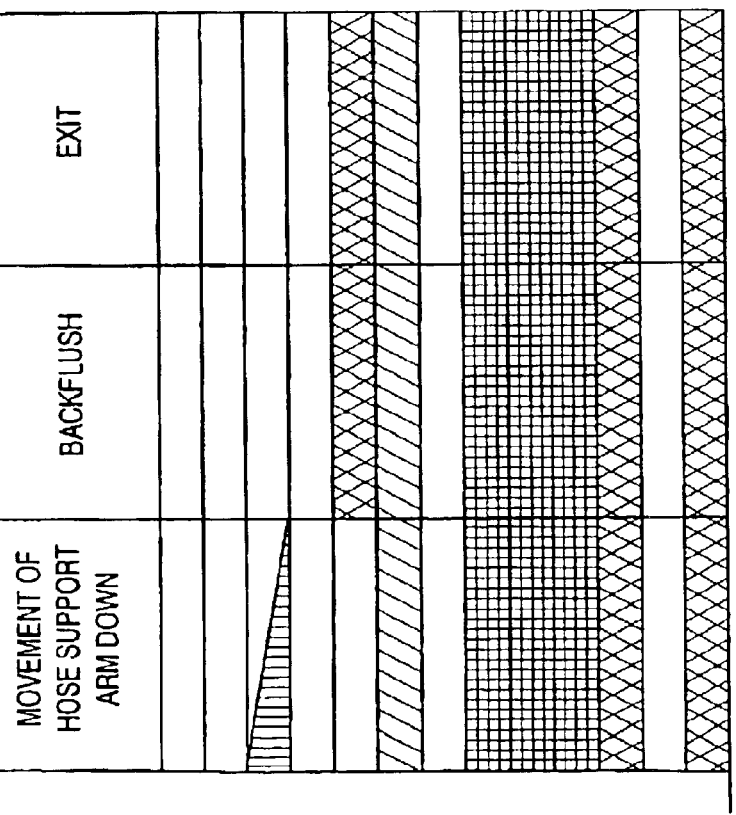

Fig. 19a

TIMING DIAGRAMS FOR AUTOMATION OF AUTOROTOR

PARLOR TIMING DIAGRAM FOR SYSTEM DURING WASH CYCLE

| OPERATIONS INITIATED FOR WASH MODE | | TIME AFTER MILKING, NO COWS ON PLATFORM, CLEANUP TIME | TIME AFTER MILKING, MAIN CLEANING BEFORE LATCH THROW | WASH SYSTEMS TURNED ON |
|---|---|---|---|---|
| DETACHER CHAIN DOWN | | | | |
| HOSE SUPPORT ARM UP | | | | |
| VACUUM ON TO MILKER | | | | |
| BACK FLUSH ON | OPTION | | | |
| PLATFORM DRIVE ON | | | | |
| WASH SYSTEM ON | | | | |
| VACUUM SUPPLY ON | | | | |
| DETACHER IN MILK MODE | | | | |
| ID SYSTEM WORKING | OPTION | | | |
| UNIT WASHER | OPTION | | | |
| PARLOR WASHER | OPTION | | | |
| DECKWASH | OPTION | | | |

MILKWASH SWITCH THROWN TO WASH POSITION (WASH LINES ATTACHED TO ROTARY)

MILKWASH SWITCH THROWN TO OFF POSITION

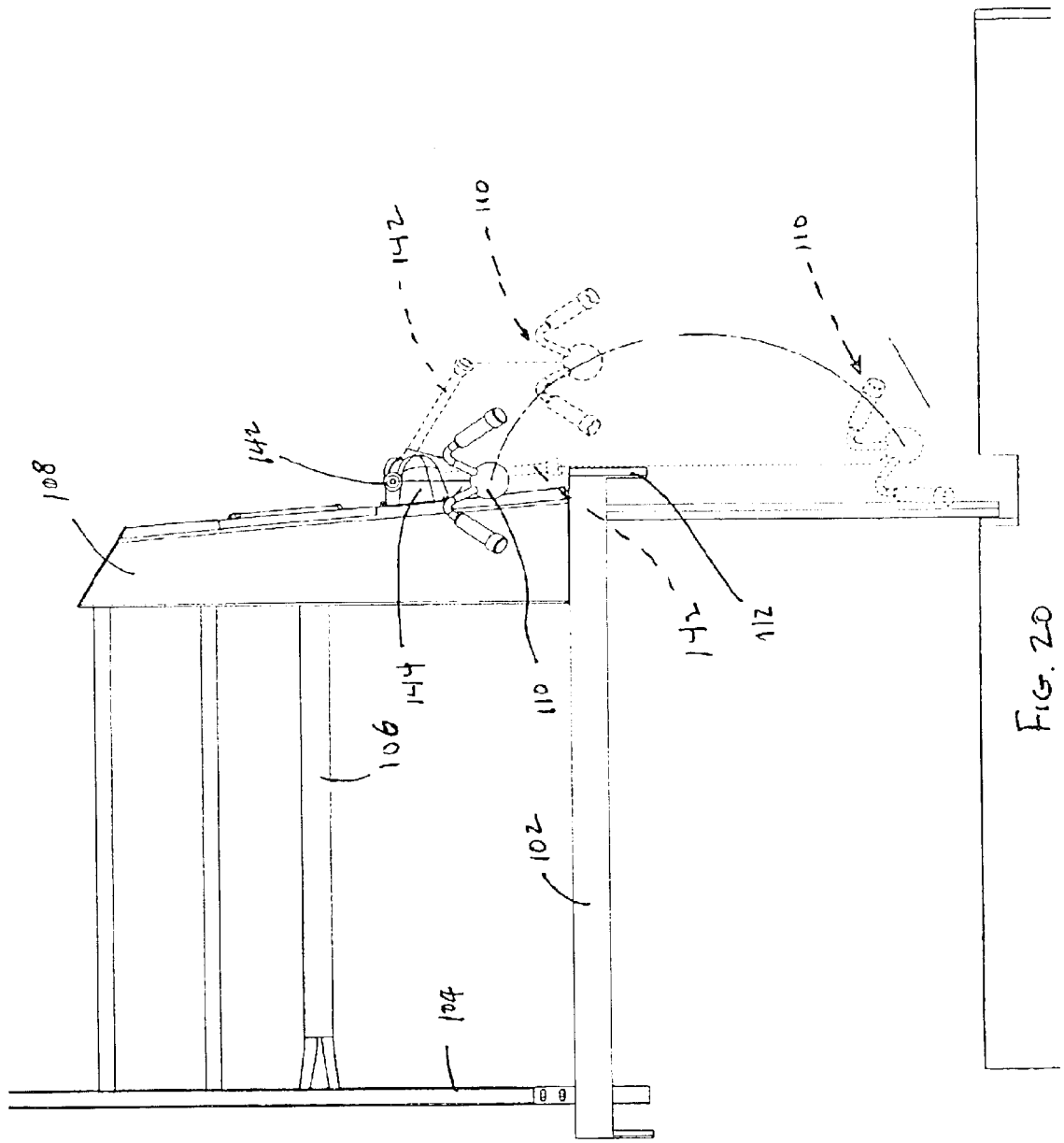

MILKER UNIT DETACHER FOR ROTARY MILKING PARLOR

FIELD AND BACKGROUND OF THE INVENTION

This invention relates generally to rotary milking parlors and more particularly to milker unit detachers for use in rotary milking parlors.

Rotary milking parlors include a rotating platform having a number of stalls in which cows are milked as the platform rotates. The platform must rotate constantly to be efficient, so the speed of rotation must be slow enough to permit cows to step safely from a stationary platform to the rotating platform.

The benefit of such an arrangement is that dairy operators are able to stand in a single location to prepare cows for milking and attach milker units to the cows. This reduces operator fatigue and improves throughput efficiency. Nonetheless, throughput in a rotary milking parlor is increased to a level at which operator fatigue and turnover remain significant issues.

One complication of such a system is the placement and storage of milker units. In stationary stall dairies, milker units can be placed at the rear or side of the stalls while the cows enter and egress from the opposite side. Operators stand near the milker unit side and attach them to the cows for milking. This is not possible in a rotary milking parlor because cows must enter and egress at the outer perimeter of the rotating platform, which is the location where milker units are positioned for access by the dairy operator.

In prior systems, the milker units were positioned to the side of each stall and then moved under the cow from the side or rear and attached by the operator. The milker units included automatic detachers that disconnected the milker unit when the platform had rotated to the location of a stationary cow exit platform.

Prior to being connected to the cows, the milker units simply hung at the ends of the stalls by the chain or rope that was connected to a stationary member of the stall that extended outwardly from the rotating platform. With such an arrangement, the milker units were exposed to being kicked as the cows entered the stalls.

While connected to the cows, the milker units had support chains or ropes that contacted the legs of the cows. The chains or ropes across the backs of the cows' legs caused cows to kick, which could disconnect the milker unit or cause damage to the milker unit and related detachers.

Further, the outwardly extending stall member arm served to support the milker unit away from the stall entrance, which caused the operator to stand away from the platform to retrieve the milker unit and then move it to a milking position between the cows' legs for attachment to the teats. This required extra movement by the operator and partially defeated the convenience of having a rotary milking parlor. Even this amount of effort by operators significantly affected operator fatigue and turnover.

In addition, supporting the milker unit out and away from the rotating platform exposed the milker units and their supporting hoses, ropes, and chains to striking the stationary platforms that surround the rotating platforms.

To minimize exposure to the stationary platform, the ends of stationary platforms were significantly tapered to provide a guide for supporting chains or ropes into the narrow gap between the rotating and stationary platforms. This arrangement prevented chains and ropes from hanging up on the stationery platform, but exposed dairy operators to the possibility of walking or falling into the large taper area, which could cause serious injury.

There is needed a rotary milking parlor detacher that safely guides milker units to and from the milking position without requiring unnecessary effort by the dairy operator. There also is needed a rotary milking parlor detacher that protects milker units and supporting chains from cows as they enter and egress the milking stalls.

SUMMARY OF THE INVENTION

The present invention is directed to a milker unit detacher for use in rotary milking parlors that safely guides milker units to and from a milking position and minimizes movement by the dairy operator and affords better ergonomics.

The present invention includes a housing on a rotary platform, a retracting mechanism joined to the housing, a support arm operatively joined to the housing for movement between a milking position and a storage position, and a detacher chain having a first end joined to the retracting mechanism and a second end for connection to a milker unit, the detacher chain operatively joined to the support arm for movement between a retracted position and an extended position, the detacher chain having sufficient length to suspend a milker unit below the elevation of the rotating platform when in the storage position.

Such a unit protects the detacher chain from tangling as cows enter and egress milking stalls, stores milker units in a safe location to avoid hanging up on stationary platforms, moves milker units between storage and milking positions without striking the platform, and presents the milker unit to operators at a convenient and ergonomically efficient position. Movement of the detacher mechanism can be synchronized with the movement of the rotating platform.

BRIEF DESCRIPTION OF THE DRAWINGS

FIGS. 16a and 16b are two parts of a single table listing the timing of various dairy operations based on stall position during a normal milking cycle.

FIGS. 17a and 17b are two parts of a single table listing the timing of various dairy operations based on stall position at a time just after the last cow in a milking cycle has departed the parlor.

FIGS. 18a and 18b are two parts of a single table listing the timing of various dairy operations based on stall position at a time during the first revolution of the rotating platform in a new milking cycle.

FIGS. 19a and 19b are two parts of a single table listing the timing of various dairy operations during a wash cycle.

FIG. 20 is a partial side view of a rotary milking parlor with the movement of the support arm and milker unit between a use position and a storage position.

DESCRIPTION OF THE PREFERRED EMBODIMENTS

Description of the Prior Art

Figure 1:
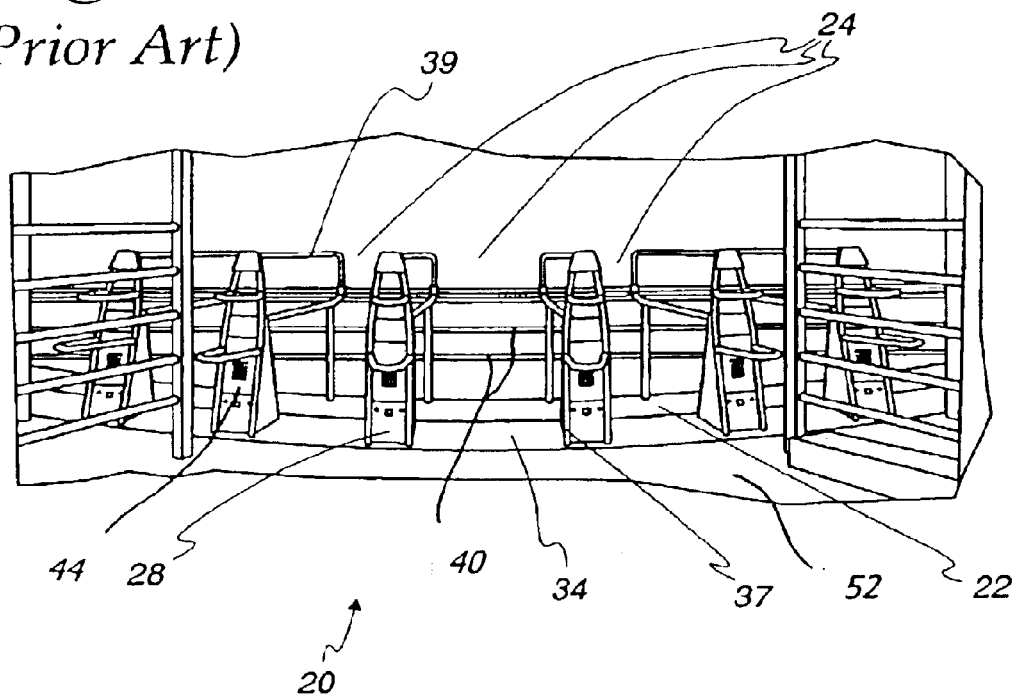
FIG. 1 is a view of a rotary milking parlor entrance having a prior art milker detacher mounted on the ends of each cow stall.

FIGS. 1 through 4 illustrate a rotary milking parlor 20 having a rotating platform 22, a plurality of milking stalls 24, milker units 28 and an operator position 30.

The rotary milking parlor 20 has an entrance 32 (FIG. 1) through which cows 26 enter a stationary platform 34. The cows walk over the stationary platform 34, on to the rotating platform 22, and into individual stalls 24. The cows are maintained within the stalls 24 by side rails 38 and front rails 39. Rear rails 40 are stationary and confine each cow as the rotating platform 22 rotates.

In use, the milker units 28 are attached to the cows by an operator (FIG. 2) who is able to stand in a single location due to the movement of the rotating platform 22. This saves the operator from moving from stall to stall as would be necessary in stationary milking stall dairy barns. The cows 26 are milked as the rotating platform 22 rotates and milking is completed before the cows reach a stationary exit platform. The milker unit 28 automatically detaches from a cow 26 as the milking process ends and the cow is then free to exit the milking parlor 20.

Operators prepare each cow for milking by cleaning applying a pre-milking teat dip, and attaching a milker unit 28 to the cow. The milker units 28 are mounted on the rotating platform 22 at the end post 37 of each stall 24.

Figure 4:
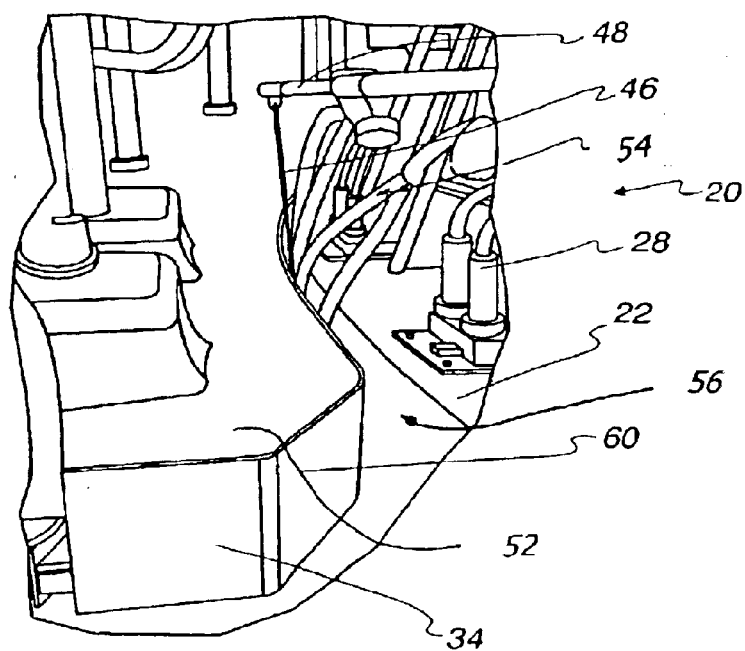
FIG. 4 is a perspective view of the milker detacher of FIG. 2 and rotary and stationary platforms defining a tapered pinch point.

The milker units 28 include teat cups and claw combinations, which are in turn connected to vacuum lines and milk lines and operated in the usual manner. A detacher 44 is also connected to each milker unit 28 via a rope 46 (which can also be a chain). When activated, the detacher 44 pulls the rope 46 straight up to a presentation position. (FIG. 4)

In the storage position, the milker unit 28 is suspended by the rope 46 at an elevation below the elevation of the rotating platform 22. A stationary support structure 48 extends radially outwardly from the rotating platform 22 (FIG. 3), to provide clearance for the milker unit 28 as it is raised and lowered between the storage position to the milking position. In the storage position, the rope 46 is fully extended from the detacher 44. A pulsation line 54 extends from the milker unit 28.

As the rotating platform 22 rotates toward the operator, the milker unit 28 is raised up to be attached to a cow for milking. During this motion, the rope 46 is retracted into the detacher 44. The detacher 44 is activated via a control panel 50.

At the completion of the milk cycle, the detacher 44 is automatically activated to retract the rope 46 and then extend the rope 46 to lower the milker unit 28 to its storage position below the elevation of the rotating platform 22. As the rotating platform 22 rotates past the exit, the suspended milker unit 28 is maintained in its storage position below the elevation of the rotating platform 22.

In this type of prior art milker detacher 44, the milker unit 28 moves from a storage position to a milking position and back to the storage position during a single rotation of the rotating platform 22.

The rotating platform 22 must be maintained in close proximity to a stationary platform 52 to provide safe and easy entrance and egress for the cows. The rope 46 that supports the milker unit 28 must therefore be guided into a gap 56 between the stationary platform 52 and the rotating platform 22 by a large tapered portion 60 on the stationary platform 52. Without such a large tapered portion 60, the length of the outwardly extending and stationary support structure 48 would maintain the rope 46 at a location where it would hang up on the stationary platform 52. To shorten the outwardly extending stationary support structure 48 would cause the milker unit 28 to make contact with the rotating platform 22 as it is raised and lowered between the milking to the storage position.

Figure 2:
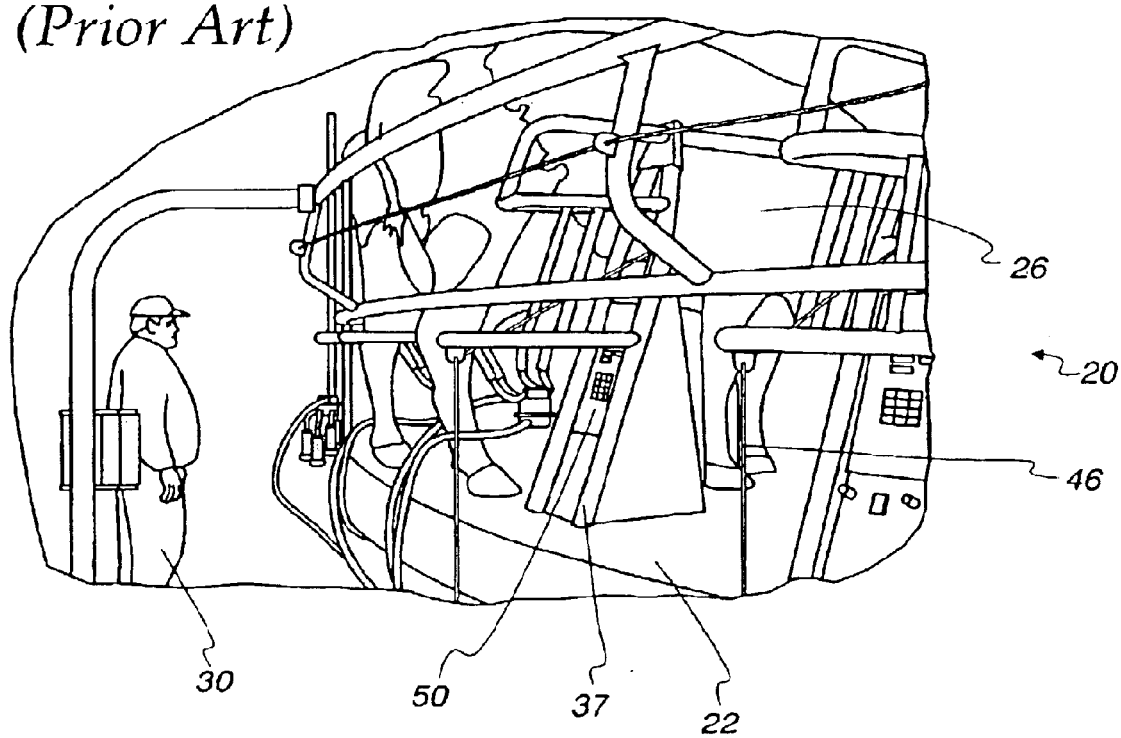
FIG. 2 is a perspective view of a rotary milking parlor with prior art milker detachers having chains or ropes across the rear of cows' legs.
Figure 3:
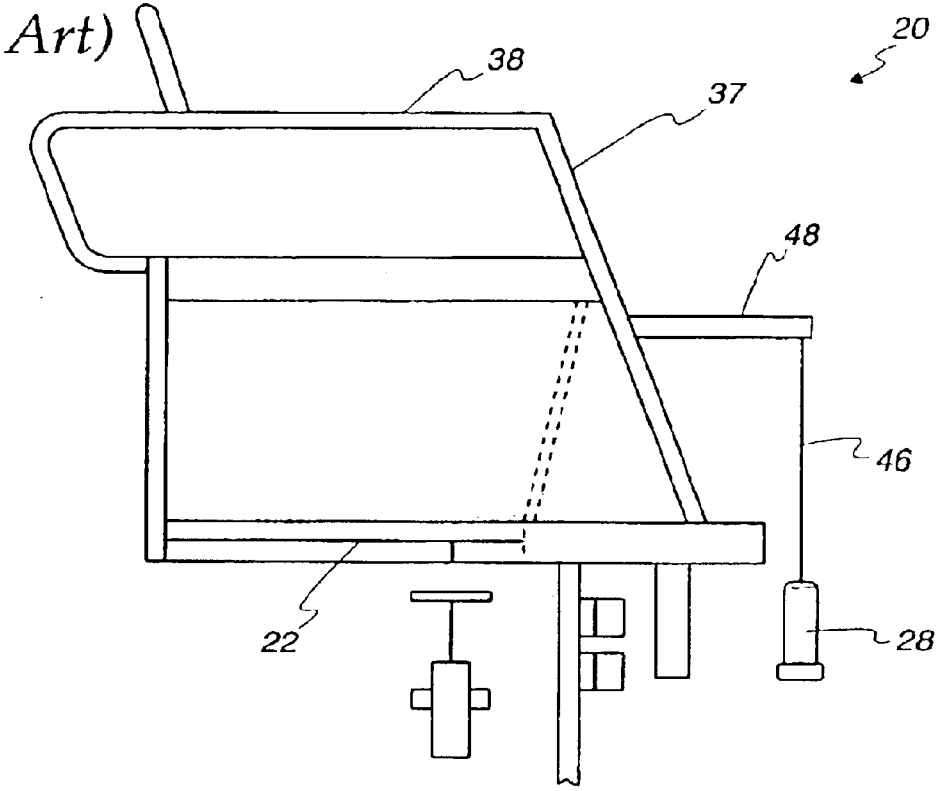
FIG. 3 is a side view of the prior art milker detacher of FIG. 2 hanging away from the rotary platform.

This prior art detacher system is inadequate for a number of reasons. As seen in FIGS. 1, 2, and 3 the rope 46 is exposed to the cows as they enter the milking parlor stalls 24. The cows can be tangled as they enter and egress the stalls 24 and the milker unit 28 can be damaged.

Once the milker unit 28 is attached to a cow, the rope 46 can make contact with the rear of the cow's legs (FIG. 2), and cause the rope 46 to be tangled on the cow's leg or cause the cow to kick.

As the milker unit 28 is raised before attachment to a cow, the support structure 48 maintains the milker unit 28 out and away from the rotating platform 22. This forces the operator to stand away from the rotating platform 22 and step forward to attach the milker unit 28 to the cow's teats. In a high throughput operation like a rotary milking parlor, this extra movement required to attach the milker unit contributes significant dairy operator fatigue and turnover.

In addition, the large tapered portion 60 of the stationary platform 52 can define a dangerously large gap into which operators can inadvertently step or fall.

Description of the Invention

Illustrated generally in FIGS. 5 through 13 is a rotary milking parlor 100 in accordance with the present invention. The rotary milking parlor 100 includes a rotating platform 102 having a number of cow stalls 104 defined by side rails 106, front rails 107, and end posts 108.

As seen in FIGS. 6 through 13, the rotating platform 102 is elevated so that an operator (not pictured) can prepare cows for milking and attach milker units 110 without bending over. The rotating platform 102 includes a rim plate 112 and an apron 114. Beneath the rotating platform 102 is a floor 116 with a recess 118 in which the apron 114 is disposed for rotation to prevent access to the underside of the rotating platform 102. The illustrated rotary milking parlor 100 is an "external" system in which operators stand outside the perimeter of the rotating platform 102. The present invention will also work with an "internal" system, in which the rotating platform has a central opening in which an operator can stand.

A rotating platform 102 can include any number of stalls, and typically includes from 16 to 100 stalls. In the illustrated embodiment, the rotating platform is about 40 inches (1016 mm) above the floor 116. The rotating platform 102 slopes away from the operator, which in the illustrated embodiment, is toward the center. Such a slope eliminates run-off into an operator area 123.

The rotating platform 102 can rotate in either direction and have variable speeds. The railings and associated support brackets are preferably adjustable. Emergency stop mechanisms (not illustrated) are desirable, and a "soft stop" that reduces deceleration to tolerable levels for cows is preferred. The size of the motor (not illustrated) to rotate the platform 102 varies with the size of the parlor. The 4 HP electric motor is usable for up to 60 stalls and a 7.5 HP electric motor can be used for up to 100 stalls.

The rotating platform 102 and stalls can be constructed of plated, hot-dipped galvanized and Stainless Steel metals. The platform 102 rotates on rollers that can be made of nylon 6.6. The deck surface can be 4000 psi (B45 Europe) concrete.

Figure 5:
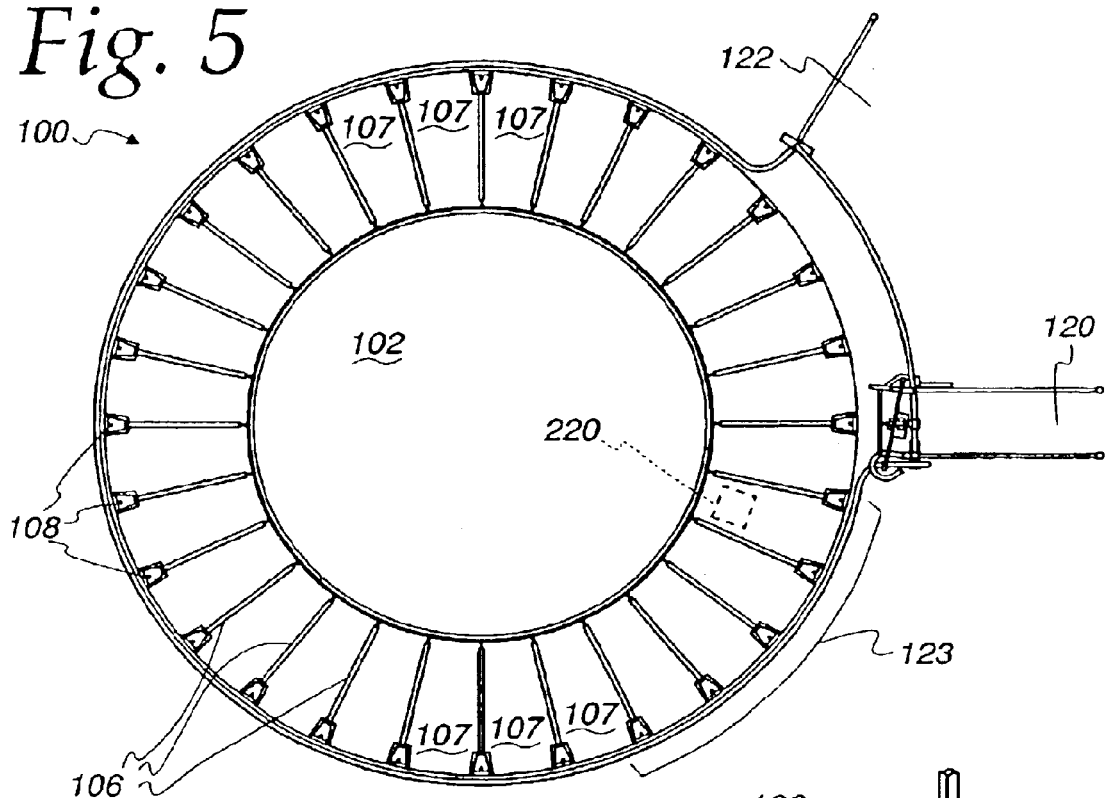
FIG. 5 is a plan view of a rotary milking parlor in accordance with the present invention.
Figure 6:
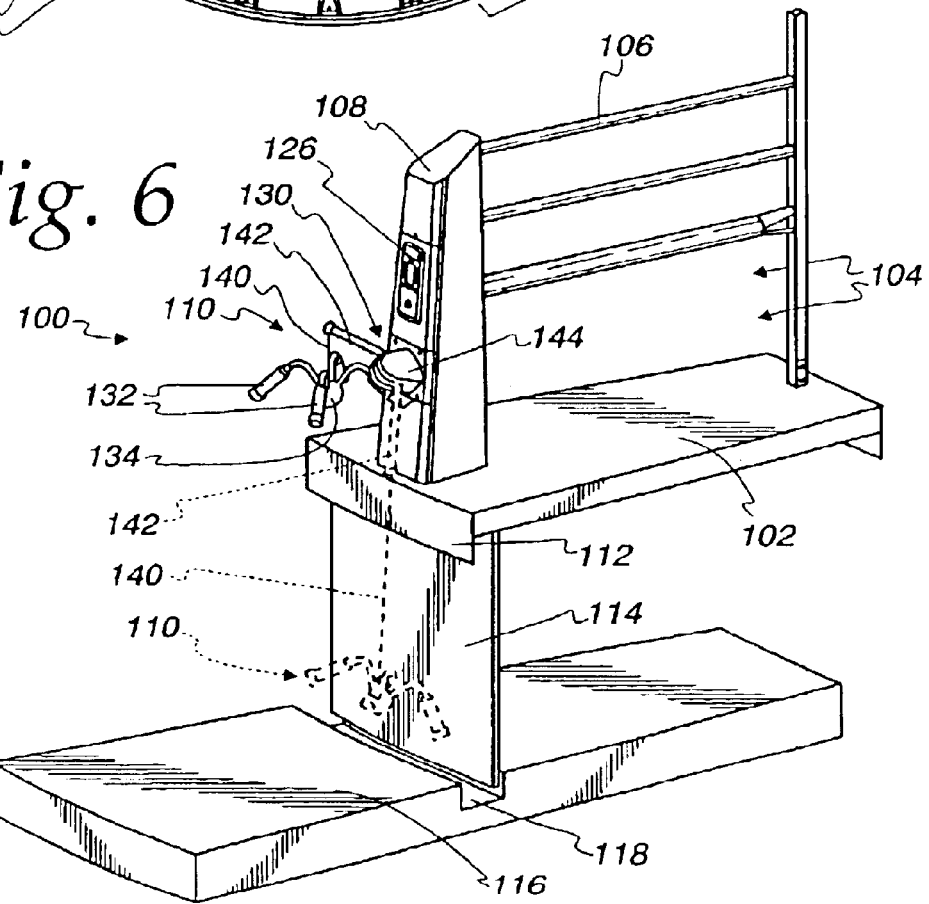
FIG. 6 is a partial perspective view of a rotary milking parlor platform having a milker unit and detacher in accordance with the present invention.

As seen in FIG. 5, adjacent to the rotating platform 102 is a stationary platform 120 that serves as an entrance for cows to step onto the rotating platform 102. There is another stationary platform 122 that serves as an exit for cows leaving the rotating platform 102. The spacing of the entrance stationary platform 120 and the exit stationary platform 122 is dependent upon the size and rotating speed of the rotating platform 102. The spacing from the entrance 120 to exit 122 must be adequate to provide a complete milking time for cows. It is desirable to provide rear rails 124 on the stationary platform 120 to prevent cows from backing out of the stalls 104 during milking.

Adjacent to the cow entrance platform 120 is the operator area 123 that can extend any necessary distance, but is preferably from three to seven stalls long. This area 123 provides one or more operators a position to clean cows, apply a pre-milking teat dip, and attach a milker unit 110.

Referring back to FIGS. 6 through 13, mounted on each stall end post 108 is a milker detacher control unit 126 that provides an operator with easy access to controls 126. The controls 126 release the milking unit 110 from a presentation position and allow the operator to move the milker unit 110 from the presentation position to a milking position.

The milker unit 110 includes four teat cups 132, a milker claw 134, and pulsation lines 138. The pulsation lines 138 connect to the dairy's central milking system (not illustrated) through hoses and connections mounted in and under the rotating platform 102.

Figure 11:
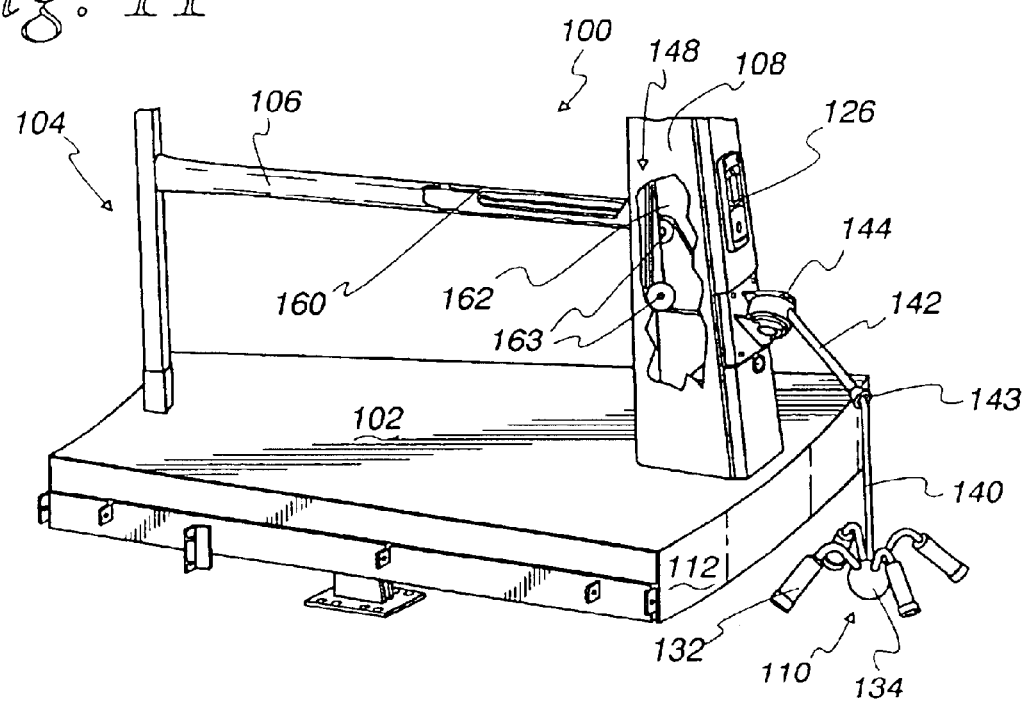
FIG. 11 is a partial perspective view of the rotary platform, milker unit, and detacher of FIG. 10 in a storage position.
Figure 12:
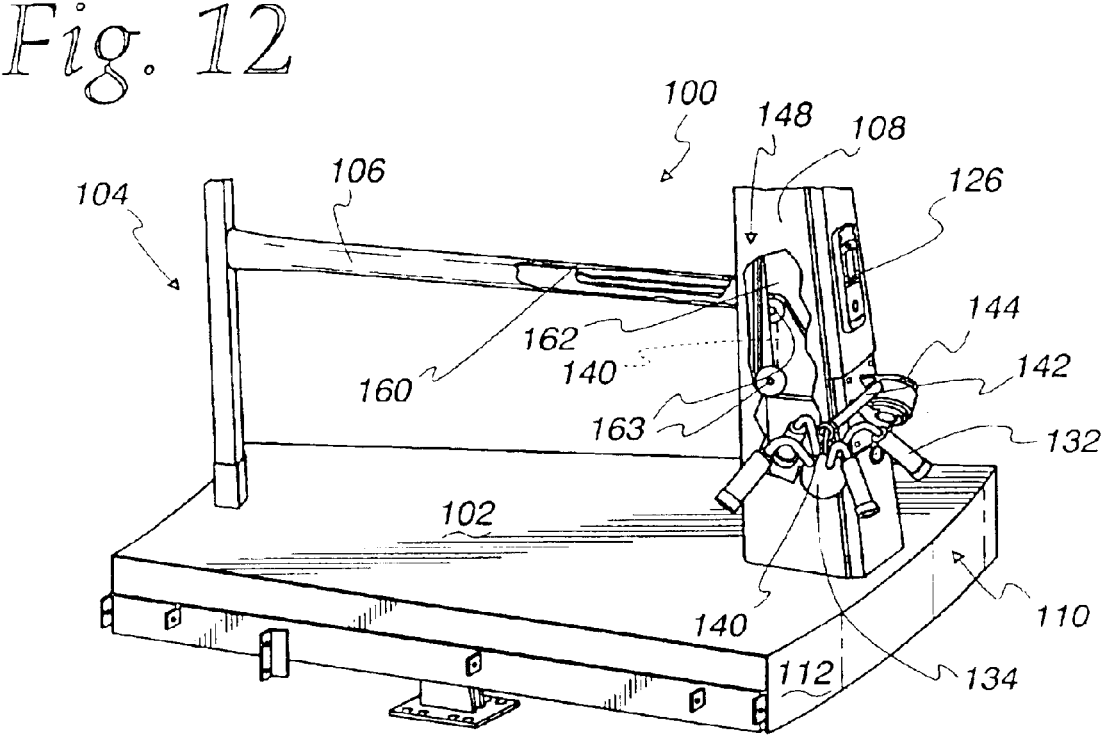
FIG. 12 is a partial perspective view of the rotary platform milker unit, and detacher of FIGS. 10 and 11, in a ready position.
Figure 13:
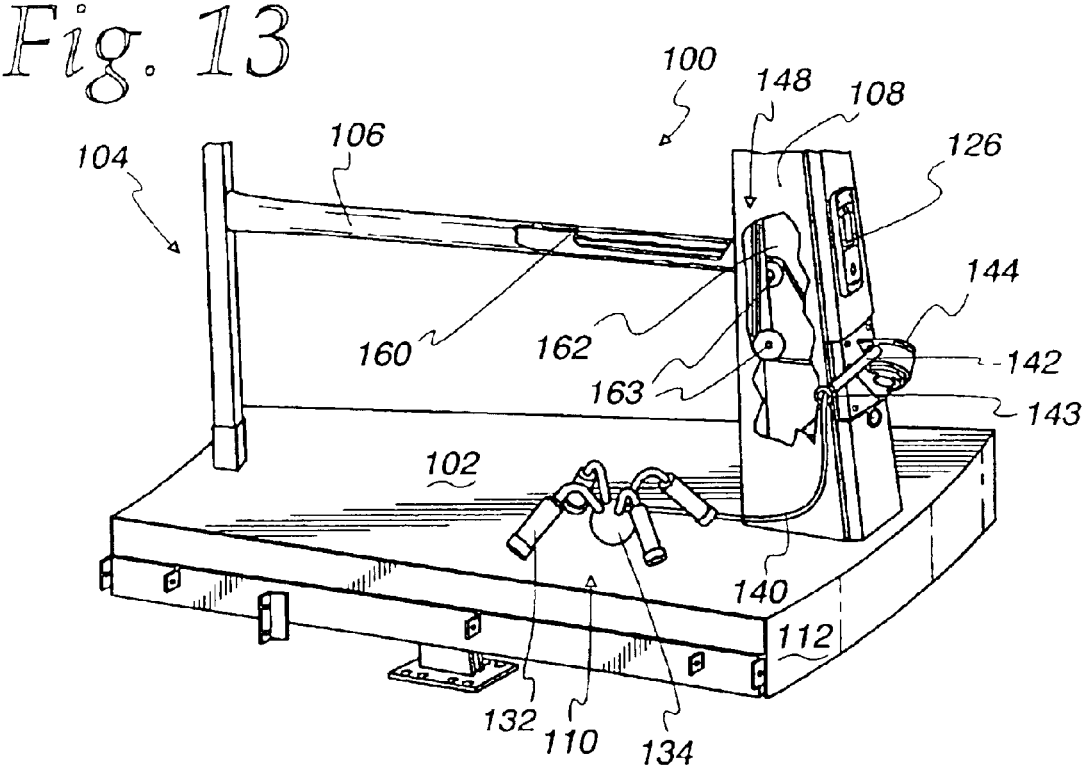
FIG. 13 is a partial perspective view of the rotary milking platform, milker unit, and detacher of FIGS. 10, 11, and 12.

The milker detacher 130 includes a chain 140, a support arm 142, and a hub 144. Movement of the chain 140, the support arm 142, and the hub 144 can be manual or controlled by a mechanism 148 mounted outside of the end post 108 or preferably mounted inside the side rails 106 and end post 108. (See: FIGS. 11 through 13.) Although the preferred embodiment depicts the detacher 130 as being mounted on an end post or as part of the stall structure, it should be clear that any housing that does not interfere with entry and egress of cows will be sufficient to support the detacher. The milker detacher 130 moves between a storage position, presentation position, and a milking position, as described below.

The chain 140 is moved from an extended position (FIGS. 6 through 8, dashed lines) to a retracted position (FIGS. 6 through 8, solid lines) as the milker detacher 130 moves from a storage position to the presentation position, respectively. In the milking position of the milker detacher 130, the chain 140 is at least partially (and possibly fully) extended. Although preferably stainless steel, the chain 140 can be any material of chain, rope, or similar flexible member.

The chain 140 extends through the support arm 142, which is preferably a hollow tube, but the support arm 142 can be any type of member that supports the chain 140 and permits the chain 140 to move between the extended and retracted positions. Preferably, the support arm 142 includes an end guide 143 (FIGS. 10 through 13) that provides a smooth gliding surface for the chain 140, and a mount 145 that supports milker unit 110 hoses. (See FIGS. 14 and 15.).

The hub 144 is operatively mounted on the end post 108 for rotational movement relative to the end post 108. The hub 144 rotates about an axis relative to the end post 108 and the support arm 142 is mounted on an angle relative to the hub's axis of rotation. The preferred axis mounting angle for the support arm 142 is at a 45° angle to the hub's 144 axis of rotation. Thus, when rotating, the preferred overall movement of the support arm 142 is from a downward vertical orientation in the storage position (FIGS. 6 to 8, dashed lines) to a horizontal orientation in the presentation (FIGS. 6 to 8, solid lines) and milking positions (FIG. 13).

As seen in FIGS. 10 through 13, the retracting mechanism 148 of the preferred embodiment includes a horizontal air cylinder 160 for retracting and extending the chain 140, and a vertical air cylinder 162 for rotating the support arm 142. Although depicted and described as including air cylinders they could by hydraulic or be manual. Further, the retracting mechanism 148 can include any device that is able to retract and extend chain or rotate the support arm 142 or both. Further, the orientation, size, and mounting location of the retracting mechanism 148 can be varied within the scope of the present invention. Preferably, the air cylinders 160 and 162 are used in conjunction with pulleys 163 to control or redirect the action of the air cylinders 160 and 162. The air cylinders 160 and 162 preferably use 60 psi compressed air and 24 VDC is used for logic control and vacuum for the sensor operation.

The retracting mechanism 148 can be operated manually, or controlled and synchronized to platform movement by a programmable logic controller ("PLC"), pre-programmed card or other control device, as described more fully below.

Figure 14:
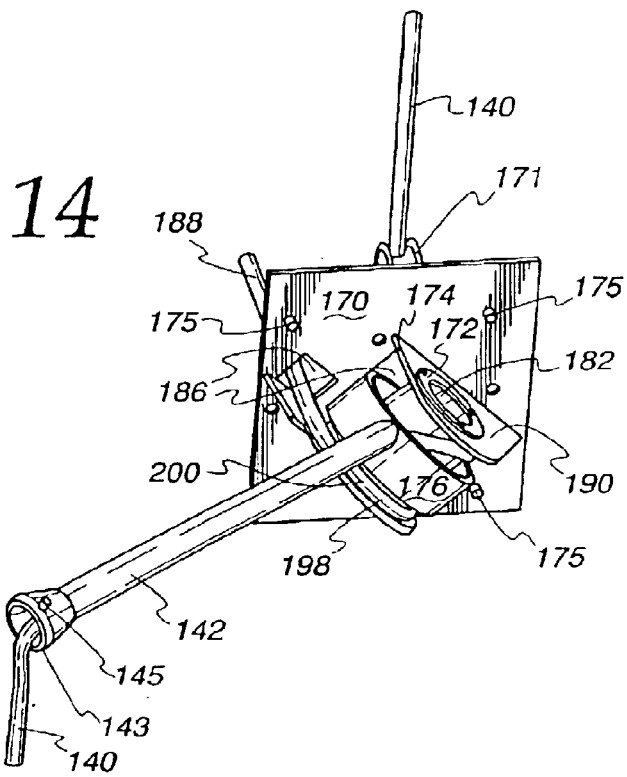
FIG. 14 is a perspective view of a hub for a milker detacher in accordance with the present invention.
Figure 15:
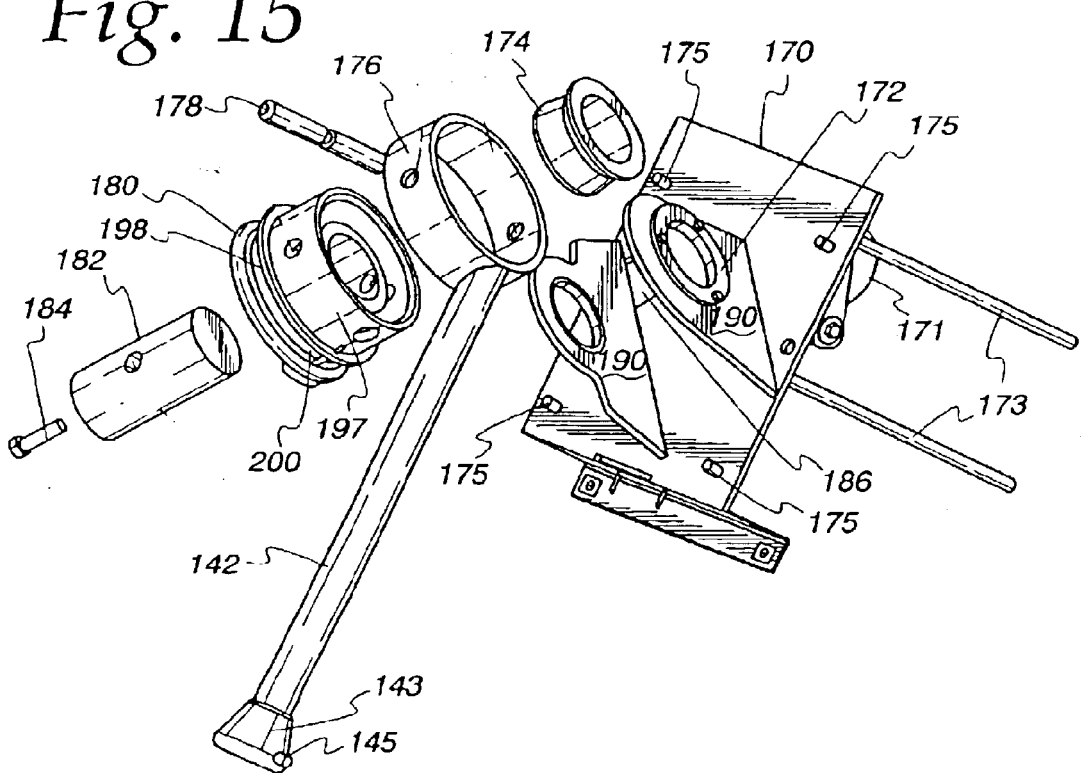
FIG. 15 is an exploded view of a hub of FIG. 14 in accordance with the present invention.

The components of the hub 144 can be seen in FIGS. 14 and 15. The hub 144 includes a hub mount 170, a rear pulley 171, a pair of bushings 172, a chain roller 174, a hub ring 176, a locking pin 178, a hub core 180, a pivot pin 182, and an assembly bolt 184.

The hub mount 170 is essentially a plate assembly that mounts on the end post 108. A pair of holes 186 in the hub mount 170 provides apertures through which the chain 140 and an arm actuator chain 188 extend for connection to the air cylinders described above. The hub mount 170 further includes a pair of bushing plates 190 that extend outwardly from the end post 108. The bushing plates 190 serve as a mounting location for the bushings 172. The bushings 172 are joined to the bushing plates 190 with screws, bolts, or other suitable connectors. The bushings 172 define an axis of rotation for the hub 144, which in the preferred embodiment, is at a 45-degree angle relative to vertical. This angle, combined with the relative angle of the support arm 142, provides the horizontal-to-vertical pivot arc that the support arm 142 travels between the presentation position and the storage position, respectively.

The hub mount 170 preferably includes a pair of tie down rods 173 that confine electrical wires away from moving components of the retracting mechanism 148. Studs 175 on the front of the hub mount 170 provide anchor points for a cover, if desired.

Part of the hub 144 is used to control movement of the chain 140, and the other part is used to control movement of the support arm 142. The chain control portion includes a rear pulley 171 joined to the rear of the hub mount 170 and preferably is disposed within the end post 108 adjacent to the horizontal air cylinder 162. The remainder of the hub 144 components is disposed between the bushing plates 190. The central component is the pivot pin 182, which is mounted in the bushings 172 for rotation relative to the hub mount 170.

The pivot pin 182 has mounted thereon, the chain roller 174. The chain roller 174 is ring-shaped and rotatable relative to the pivot pin 182. On its outer annular surface the chain roller 174 has a central detented portion that maintains the chain 140 on the chain roller 174 as they move. The chain 140 extends from the vertical air cylinder 162, over the rear pulley 171, through a plate hole 186, over at least a portion of the chain roller 174, through the support arm 142, and to the milker unit 110. As the air cylinder 162 is activated, the chain 140 is either retracted or extended over this portion of the hub 144.

The hub core 180 is also disposed over the pivot pin 182, but it does not rotate relative to the pivot pin 182, as does the chain roller 174. Instead, the hub core 180 is fixed to the pivot pin 182 for rotation therewith. The hub ring 176 fits over and is fixed to a first portion 197 of the hub core 180. The locking pin 178 extends through mating holes in the hub ring 176, the hub core 180, and the pivot pin 182 to fix these components together for rotation. The support arm 142 is fixed to the hub ring 176 for rotation therewith. The support arm 142 is joined at its proximate end to the hub ring 176 at an angle of about 45 degrees relative to the axis of rotation for the hub 144. Further, the relative angles described above can, in part, be accommodated by the angle of the hub mount 170 relative to the end post 108, as illustrated.

Next to the first portion 197 of the hub core 180, is a second portion 198 that has an outer annular surface that is detented to accommodate the arm actuator chain 188. The second portion 198 also includes an anchor point 200 for the arm actuator chain 188. In operation, the vertical air cylinder 160 is activated to retract or extend the arm actuator chain 188 over a pulley assembly 163, through a plate hole 186 and at least a partially around the second portion 198 of the hub core 180. When activated by the air cylinder 160, the arm actuator chain 188 will preferably rotate the hub core 180 and the support arm 142 through an angle of about 45 degrees.

The assembly bolt 184 connects the locking pin 178 to the pivot pin 182 so that the locking pin 178 cannot be removed without first removing the bolt 184.

Figure 10:
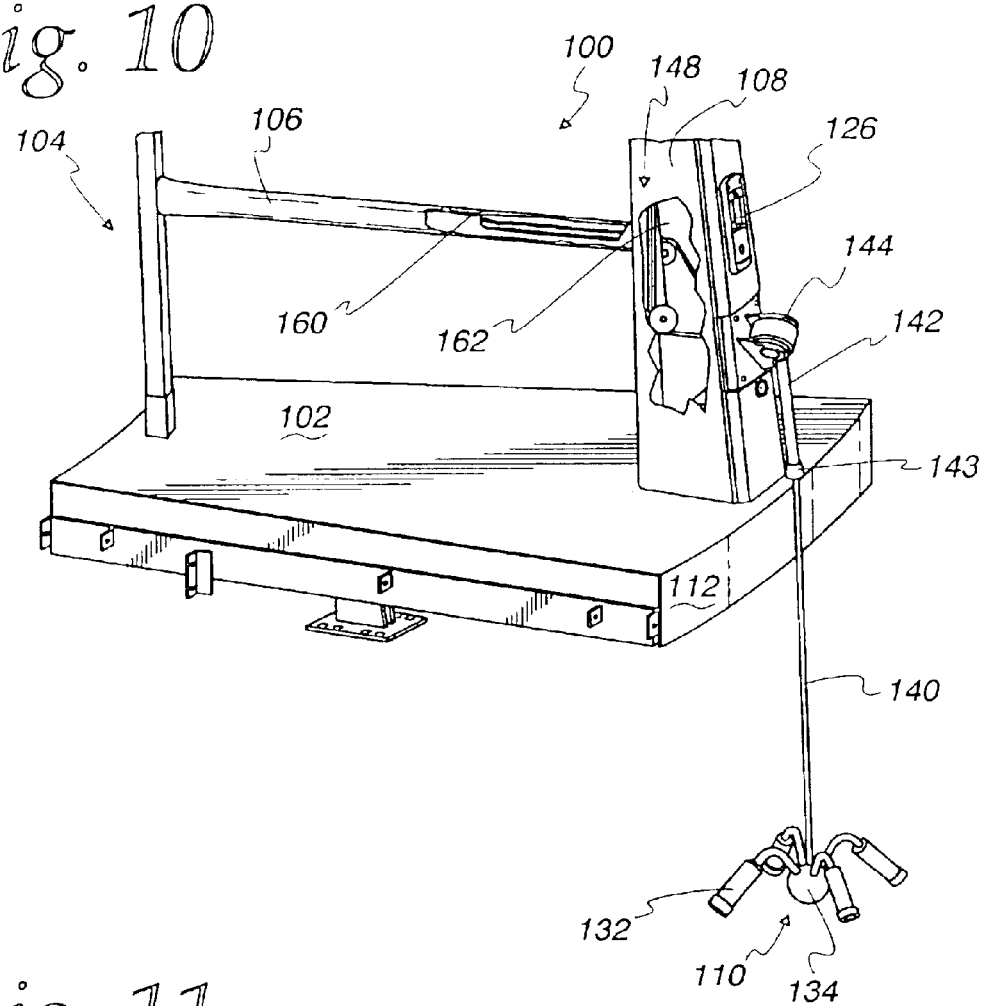
FIG. 10 is a partial perspective view of a rotary milking parlor platform, milker unit, and detacher mechanism in accordance with the present invention.

With the above-described assembly, the milker unit 110 will move between a storage position (where the chain 140 is extended and the support arm 142 is vertically downward, FIG. 10), a presentation position (where the chain 140 is retracted and the support arm 142 is horizontal, FIG. 12), and a milking position (where the chain 140 is at least partially extended and the support arm 142 is horizontal, FIG. 13), without the milker unit striking the rotating platform 102 (FIG. 11).

Figure 7:
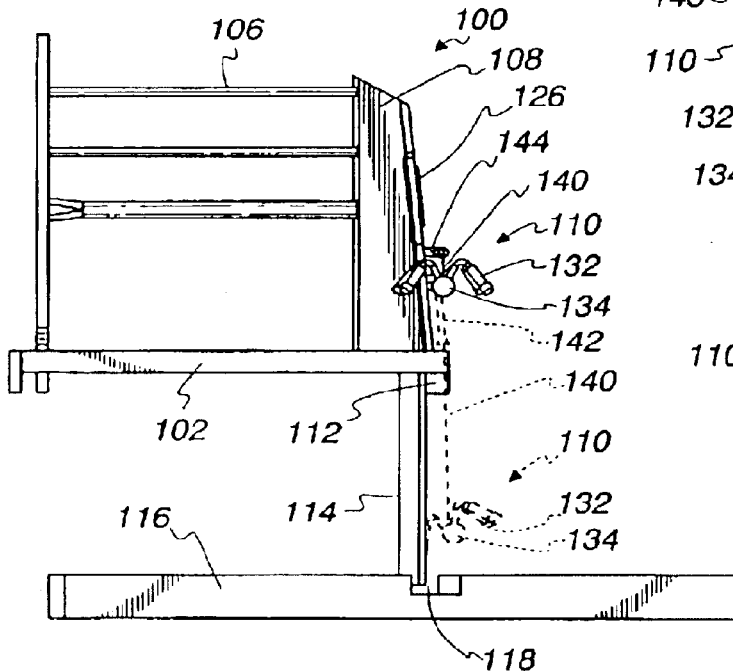
FIG. 7 is a partial side view of the rotary milking platform milker unit, and detacher of FIG. 6, illustrating the milker unit in a storage position and a ready position.
Figure 8:
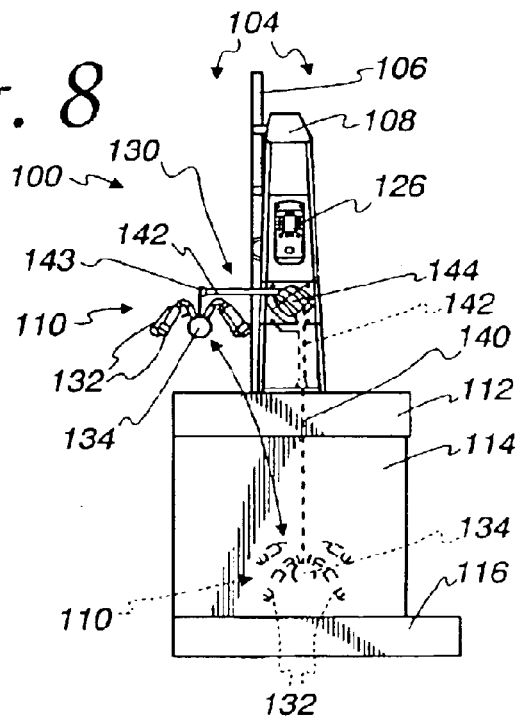
FIG. 8 is a partial side view of the rotary milking parlor platform, milker unit, and detacher of FIG. 6 in the storage position and the ready position.
Figure 9:
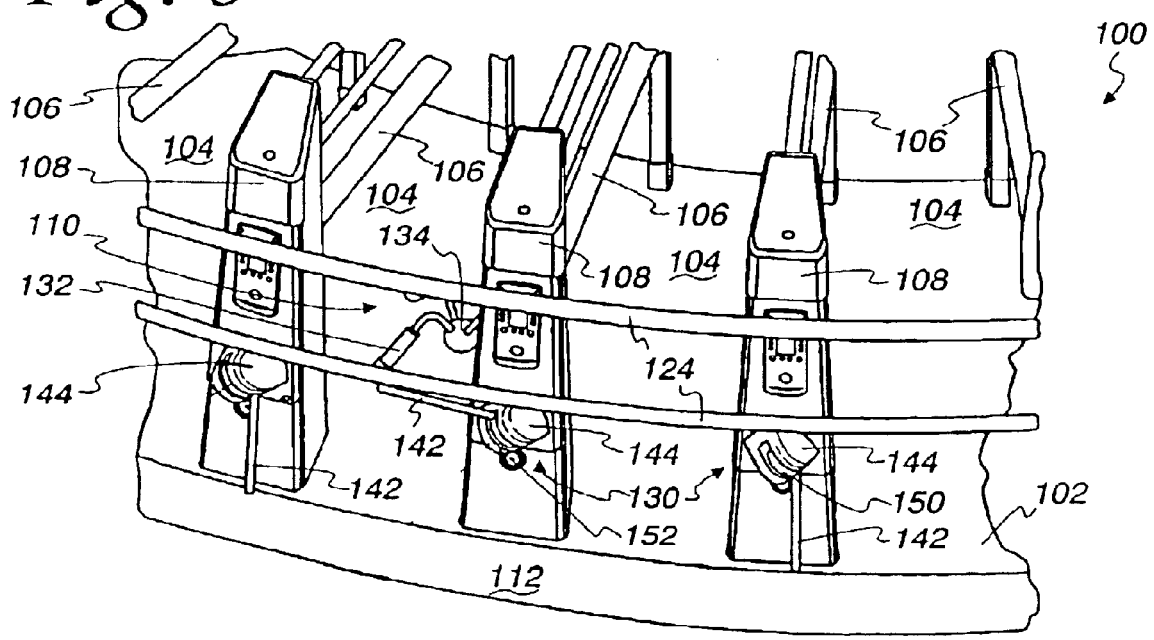
FIG. 9 is a partial perspective view of a rotary milking parlor with several milking stalls and a milker detacher in accordance with the present invention mounted on the end of each stall.

In the storage position, the lower end (distal end) of the support arm 142 is very near the rim plate 112 of the rotating platform 102 so that the chain 140 hangs immediately adjacent to or against the rim plate 112 (FIG. 7). This maintains the chain 140 and the milker unit 110 safely away from the stationary platform 122 and does not require the use of a tapered portion on the stationary platform 122 to guide the chain 140 and milker unit 110 to a gap between the platforms.

As the detacher 130 moves from the storage position to the presentation position, the horizontal air cylinder 160 retracts the chain 140 and the vertical air cylinder 162, and the hub 144 pivots the support arm 142 at a 45° angle relative to vertical. This simultaneously raises and moves the milker unit 110 outward to avoid hitting the rotating platform 102 (FIG. 11). Further simultaneous movement positions the milker unit 110 over the rotating platform 102 and behind a cow to a presentation position where it is ready to be moved to a milking position by an operator.

When the detacher 130 moves from the milking position to the storage position, the chain 140 is retracted and the arm 142 pivoted so that the milker unit 110 swings out away from the rotating platform 102. Then the chain 140 is extended and the arm 142 moved further downward to position the milker unit 110 below the rotating platform 102 without contacting the rotating platform 102.

The present invention retracts the milker unit 110 from between the rear of the cow's legs to prevent entanglement of the chain 140. In the presentation position, the milker unit 110 is over the rotating platform 102, which allows the operator to stand closer to the rotating platform 102 and presents the milker unit 110 at an ergonomically superior position. With the support arm 142 in the form of a tube that extends downward to the rotating platform 102 in the storage position, the chain 140 is protected from cows as they enter the rotating platform stalls 104. Further, the end of the support arm 142 serves to provide a hose support device attachment point to avoid having hoses or chains contacting the rear of a cow's leg.

As stated above, synchronization of the rotating platform stalls 104 and the detacher 130 can be used in the present invention. Computer control of the operation is a preferred approach for synchronization. To provide data to a computer of any synchronization device, a stall position sensor 220 (FIG. 5) can be used. Preferably, the stall position sensor 220 is positioned beneath the rotating platform 102, near the entrance 120, but it can be positioned at other locations. The stall position sensor data will control whether the detacher 130 should be in a storage, presentation, or milking position. Manual overrides can be used to override any automated control. FIGS. 16a through 19b are tables that provide logic for use in synchronizing the rotating platform stalls with the milker detacher 130. Further, manual operation of the detacher 130 is an option, and is preferred in some installations.

Figure 16A:
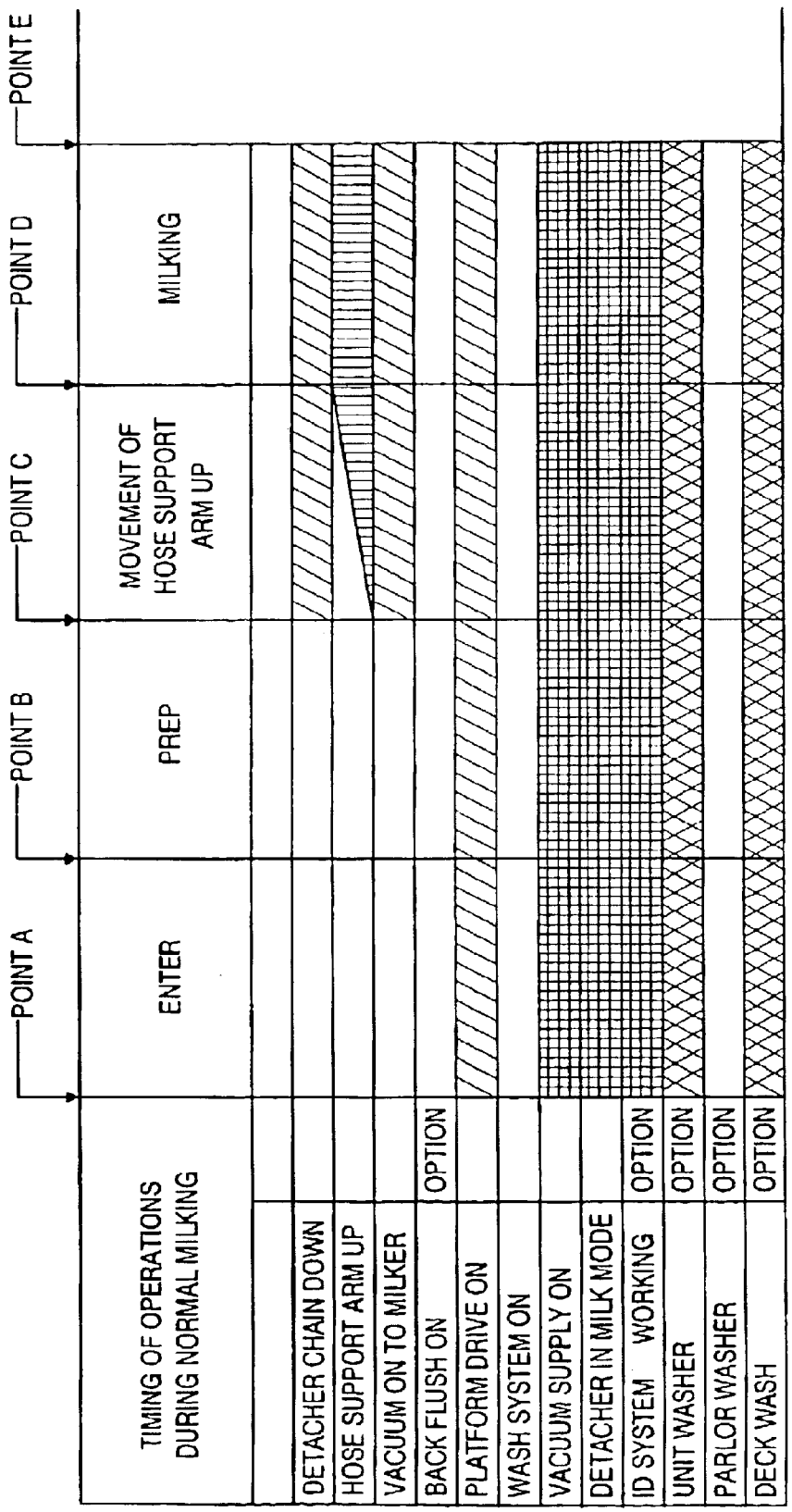

FIGS. 16a and 16b are two parts of a single table listing the timing of various dairy operations based on stall position during a normal milking cycle. A legend is included providing additional details about the symbols used in the tables to describe various activity conditions.

Figure 18A:
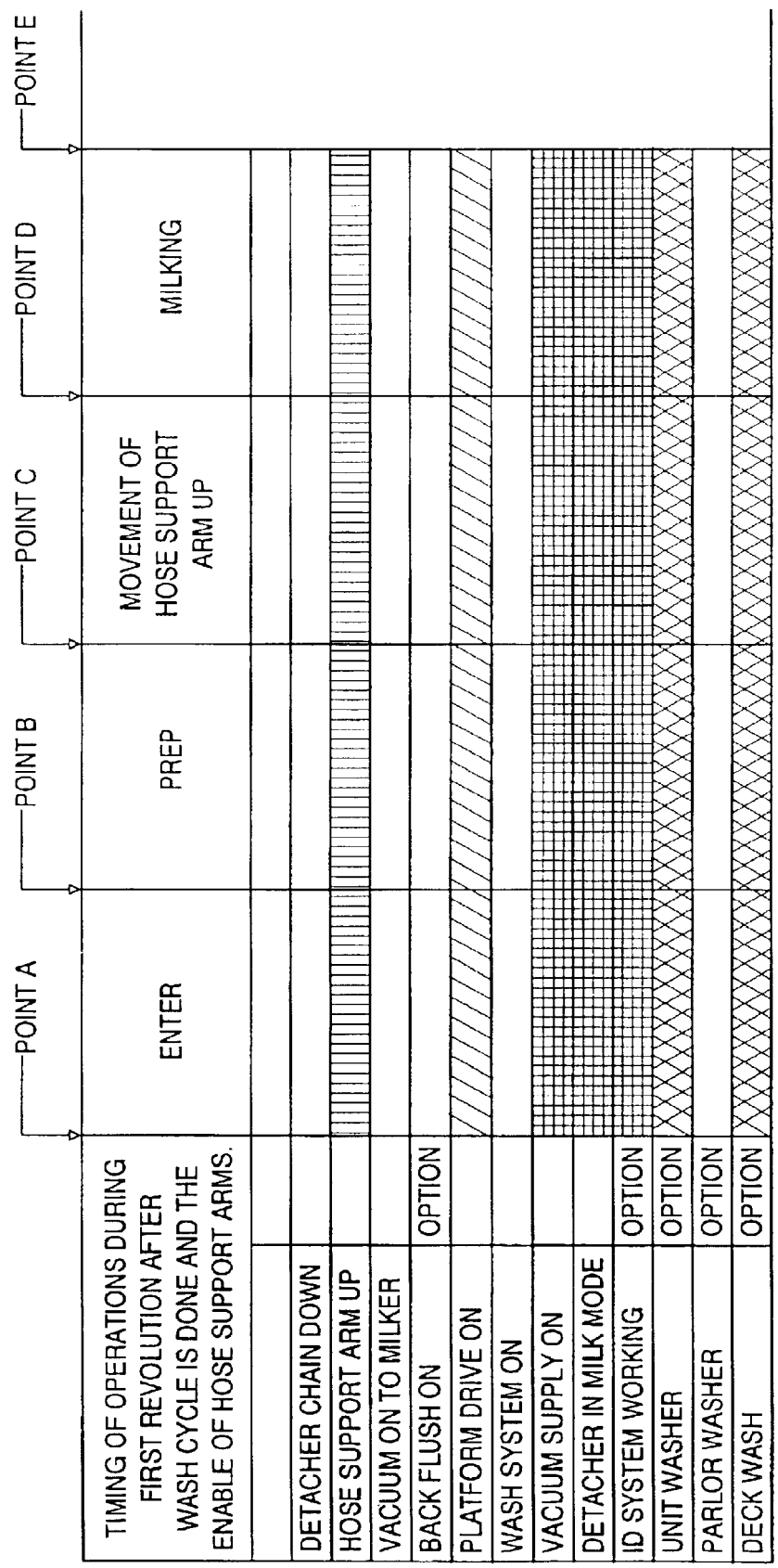

FIGS. 17a and 17b are two parts of a single table listing the timing of various dairy operations based on stall position at a time just after the last cow in a milking cycle has departed the parlor. FIGS. 18a and 18b are two parts of a single table listing the timing of various dairy operations based on stall position at a time during the first revolution of the rotating platform in a new milking cycle after a wash cycle and a reset of the support arms.

Figure 19B:
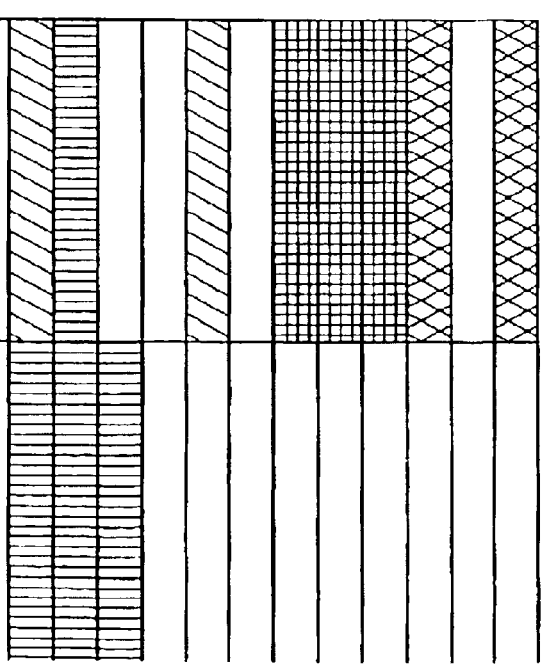

FIGS. 19a and 19b are two parts of a single table listing the timing of various dairy operations during a wash cycle.

The particular software code used to operate the system is not critical so long as the timing of the operations meets the preferred conditions set forth in the tables of FIGS. 16a through 19b.

A preferred embodiment of the present invention is available from Westfalia-Surge Inc. of Galesville, Wis. under the trademark Magnum 90 AutoRotor.

The foregoing detailed description of the drawings is presented for clearness of understanding only, and no unnecessary limitations there from are to be read into the following claims.

What is claimed is:

1. A milker detacher for use on a rotary milking parlor that has a rotating platform and a plurality of cow stalls on the rotating platform in which cows can stand while being milked, the milker detacher comprising:
   a housing mounted on the rotating platform;
   a retracting mechanism joined to the housing;
   a support arm joined to the housing for movement between a milking position and a storage position;
   a detacher chain operatively joined to the retracting mechanism for movement between an extended position and a retracted position, the detacher chain having a length sufficient to suspend a milker unit at an elevation below the rotating platform when the chain is in the extended position; and a hub operatively disposed between the retracting mechanism and the support arm, the hub having an axis of rotation when moving between the milking position and the storage position and the support arm is joined to the hub at a 45° angle to the axis.

2. The milker detacher of claim 1, wherein the housing includes an end post in a stall on the rotary platform.

3. The milker detacher of claim 1, wherein the retracting mechanism is mounted at least partially inside of the housing.

4. The milker detacher of claim 1, wherein the retracting mechanism comprises pneumatic cylinders for moving the detacher chain between the milking position to the storage position.

5. The milker detacher of claim 1, wherein the support arm is substantially horizontal in the milking position and substantially vertical in the storage position.

6. The milker detacher of claim 1, wherein the support arm has a distal end positioned adjacent to an outer rim of the rotating platform when in the storage position.

7. The milker detacher of claim 1, wherein the support arm is in the milking position and the detacher chain is in the extended position to define a milking position for the milker detacher.

8. The milker detacher of claim 1, wherein the support arm is in the milking position and the detacher chain is in the retracted position to define a presentation position for the milker detacher.

9. The milker detacher of claim 1, wherein the support arm is in the storage position and the detacher chain is in the extended position to define a storage position for the milker detacher.

10. The milker detacher of claim 1, wherein the retracting mechanism controls movement of the support arm between the milking position and the storage position, and is synchronized to a rotation position of the rotating platform.

11. The milker detacher of claim 1, wherein the detacher chain is disposed between the rotary platform and a stationary platform when the support arm is in the storage position.

12. The milker detacher of claim 1, wherein the detacher chain is spaced apart from the rotating platform when the support arm is between the storage position and the presentation to thereby suspend a milking machine away from the rotating platform.

13. A milker detacher for use on a rotary milking parlor that has a rotating platform and a plurality of cow stalls on the rotating platform in which cows can stand while being milked, the milker detacher comprising:
   a housing mounted on the rotating platform;
   a retracting mechanism joined to the housing;
   a support arm joined to the housing for movement between a milking position and a storage position;
   a detacher chain operatively joined to the retracting mechanism for movement between an extended position and a retracted position, the detacher chain having a length sufficient to suspend a milker unit at an elevation below the rotating platform when the chain is in the extended position;
   a hub mount;
   a rear pulley joined to the hub mount;
   a pair of bushings joined to the hub mount;
   a pivot pin disposed in the bushings for rotational movement relative thereto;
   a chain roller rotatably disposed over the pivot pin, whereby the chain extends from the retracting mechanism over the rear pulley and the chain roller before being supported by the pivoting support arm;
   a hub core fixed to the pivot pin and the pivoting support arm; and
   a support arm chain that is connected to the retracting mechanism and is joined to the hub core to rotate the hub core and pivoting support arm when the retracting mechanism is activated.

14. The rotary milking parlor of claim 13, wherein the housing includes an end post in a stall on the rotary platform.

15. The rotary milking parlor of claim 13, wherein the retracting mechanism is mounted at least partially inside of the housing.

16. The rotary milking parlor of claim 13, wherein the retracting mechanism comprises pneumatic cylinders for moving detacher chain between the milking position to the storage position.

17. The rotary milking parlor of claim 13, wherein the support arm is substantially horizontal in the milking position and substantially vertical in the storage position.

18. The rotary milking parlor of claim 13, wherein the support arm has a distal end positioned adjacent to an outer rim of the rotating platform when in the storage position.

19. The rotary milking parlor of claim 13, wherein the support arm is in the milking position and the detacher chain is in the extended position to define a milking position for the milker detacher.

20. The rotary milking parlor of claim 13, wherein the support arm is in the milking position and the detacher chain is in the retracted position to define a presentation position for the milker detacher.

21. The rotary milking parlor of claim 13, wherein the support arm is in the storage position and the retracting chain is in the extended position to define a storage position for the milker detacher.

22. The rotary milking parlor of claim 13, wherein the retracting mechanism controls movement of the support arm between a milking position and the storage position, and is synchronized to a rotation position of the rotating platform.

23. The rotary milking parlor of claim 13, wherein the detacher chain is disposed between the rotary platform and the stationary platform when the support arm is in the storage position.

24. The rotary milking parlor of claim 13, wherein the detacher chain is spaced apart from the rotating platform when the support arm is moving between the storage position and the milking position to thereby suspend a milking machine away from the rotating platform.

25. A rotary milking parlor comprising;

rotating platform;

a plurality of cow stalls on the rotary platform; and a milker detacher mounted on the rotary platform, the milker detacher comprising:

a housing mounted on the rotating platform;

a retracting mechanism joined to the housing;

a support arm joined to the housing for movement between a milking position and a storage position;

a detacher chain operatively joined to the retracting mechanism for movement between an extended position and a retracted position, the detacher chain having a length sufficient to suspend a milker unit at an elevation below the rotating platform when the chain is in the extended position; and a hub operatively disposed between the retracting mechanism and the support arm, the hub having an axis of rotation when moving between the milking position and the storage position and the support arm is joined to the hub at a 45° angle to the axis.

* * * * *

UNITED STATES PATENT AND TRADEMARK OFFICE
CERTIFICATE OF CORRECTION

PATENT NO. : 6,814,027 B2
DATED : November 9, 2004
INVENTOR(S) : Hein et al.

It is certified that error appears in the above-identified patent and that said Letters Patent is hereby corrected as shown below:

<u>Title page,</u>
Item [56], References Cited, U.S.PATENT DOCUMENTS, the following reference should be included, -- U.S. Patent No. 6,336,424 B1   1/2002   Kullberg et al. --.

Signed and Sealed this

Sixteenth Day of August, 2005

JON W. DUDAS
*Director of the United States Patent and Trademark Office*